July 23, 1957  C. E. NELSON  2,800,106
AUTOMATIC FEEDER FOR POULTRY
Filed Nov. 26, 1954  2 Sheets-Sheet 1
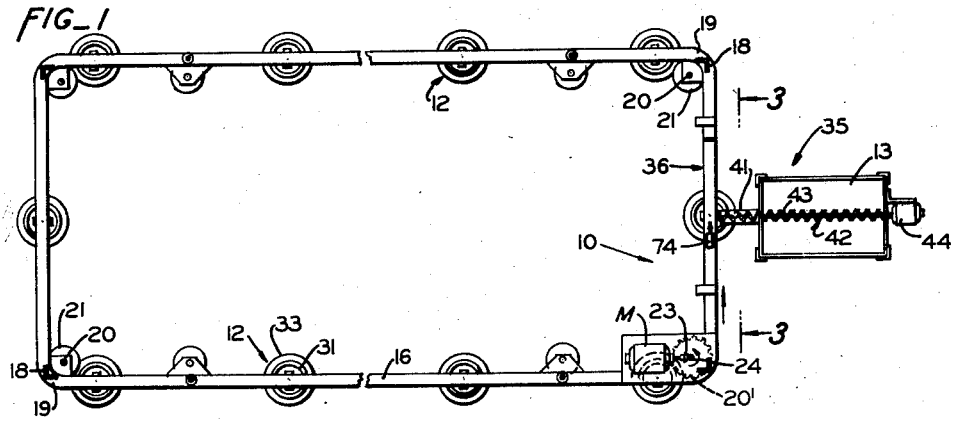
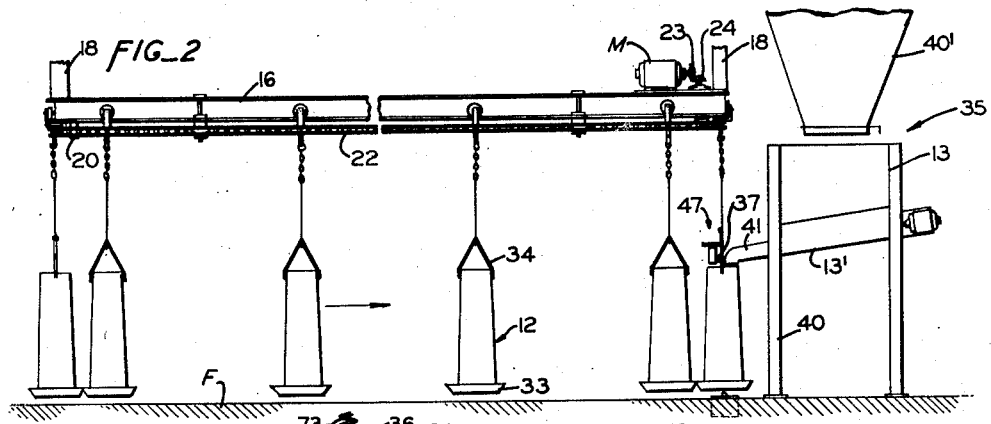
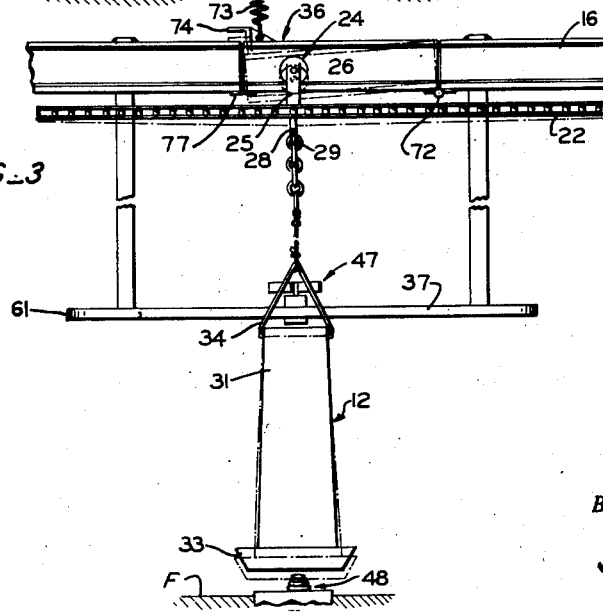
INVENTOR.
CLARENCE E. NELSON
BY
Hansen and Lane
ATTORNEYS

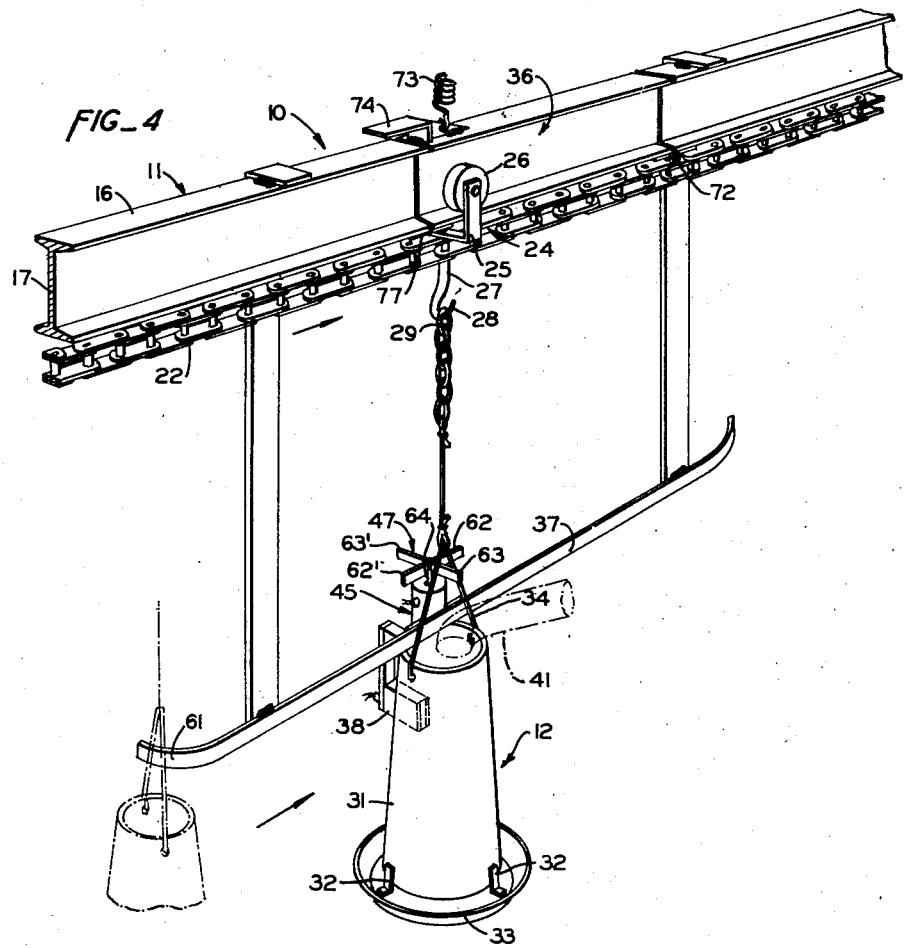
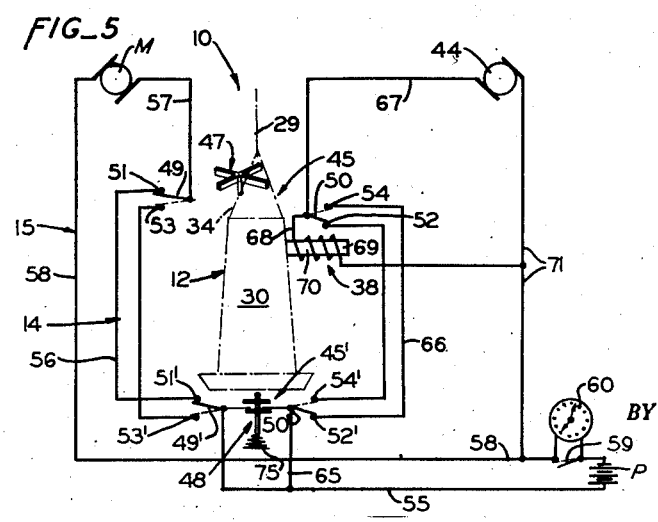

United States Patent Office 2,800,106
Patented July 23, 1957

2,800,106

AUTOMATIC FEEDER FOR POULTRY

Clarence E. Nelson, Campbell, Calif.

Application November 26, 1954, Serial No. 471,193

8 Claims. (Cl. 119—52)

This invention relates to feeders for poultry and more particularly to an automatic device of this general class which will serve to replenish the feed in a poultry house at predetermined times.

Numerous devices having the same general purpose have been developed but in most instances these prior known types of feeders have proven unsatisfactory because of their complex construction, their repeated breakdowns, mainly because their working parts are located on or adjacent the floor of the enclosure where droppings and scratchings can get into the working parts. The present invention seeks to overcome such objectionable characteristics as well as others by the provision of a feeder adapted to be suspended from an overhead structure. In addition to the foregoing, the present invention contemplates the provision of a feeder which is simple in construction having a minimum of moving parts and one which can be economically constructed and/or repaired with a minimum of effort or loss of time.

One object of this invention is to provide a single endless conveyor from which a plurality of feed buckets are suspended and means for moving the same intermittently or in steps for filling each bucket automatically. In connection with the foregoing, it is a further object of this invention to provide a control means operatively associated with the conveyor and individual buckets for affecting such intermittent operation automatically. This arrangement includes the provision of a supply hopper filled with grain or feed and automatically operated gate means associated therewith for admitting predetermined quantities of feed into each bucket in timed relation with said intermittent movement thereof.

These and other objects and advantages of the present invention will become apparent from a reading of the following description in the light of the drawings in which:

Fig. 1 is a plan view of an automatic feeder for poultry embodying the present invention.

Fig. 2 is a side elevation of the automatic feeder shown in Fig. 1.

Fig. 3 is another side elevation, partly in section, of the feeder of Fig. 1 and taken substantially along line 3—3 therein, Fig. 3 being of slightly larger scale.

Fig. 4 is an enlarged fragmentary perspective view of that portion of the feeder shown in Fig. 3.

Fig. 5 is a schematic wiring diagram embodied in the feeder shown in Figs. 1 through 4.

At the outset it should be understood that poultry, such as chickens, are raised from the chick stage to fryer size in a period of about ten weeks. Under present practices it is the custom to place a batch of chicks within an enclosure usually consisting of a shed type structure constructed in areas suitable to shelter the number of birds in the particular batch. From the time of their admittance into this enclosure until they are ready for market (usually ten weeks) the chicks are not moved or otherwise handled. Neither is the enclosure cleaned, except perhaps for the application of straw over the floor area F to cover the droppings. In this connection there is no labor involved other than to keep the feed troughs and water containers in the enclosure continually supplied so that the chicks can eat and drink during all of their waking hours.

The feeding device of the present invention, generally designated 10 in the drawings, is installed within the enclosure. In general this feeding device comprises a conveyor 11 for a plurality of individual feed buckets 12 movable by a source of power in the form of motor M to and from a feed supply hopper 13, there being an automatic control means 14 in the form of an electrical circuit 15 including switches and other ancillary elements for effecting automatic operation of the device 10.

The conveyor 11 comprises an overhead track 16 which may be of any suitable form such as a metal channel or I beam 17 assembled to provide an endless way. This overhead track 16 is suspended by hangers 18 from any overhead structure such as roof trusses, joists or girders of the enclosure so as to support the track 16 a suitable distance above the floor F thereof so that the birds will not roost upon it. The track 16 as shown in Figs. 1 and 2 has corners 19 behind which horizontally disposed gusset plates are secured to provide bearings or journals for vertical shafts 20. Each of these shafts 20 has a sprocket 21 secured thereto to receive and support an endless chain 22 for guiding the same in a path congruent to the track 16. It should here be made apparent that the foregoing arrangement may include pulleys and an endless cable or such flexible element in lieu of the chains and sprocket arrangement if desired.

In either event the corners 19 are formed to provide an arcuate track section A each struck on a radius from the respective shafts 20 to which the sprockets 21 are secured. One shaft 20' is provided with a bevel gear 23 meshing with a companion bevel gear 24 secured to the shaft of the motor M. This motor M is suitably secured to the suspended overhead track structure 16 in a position to clear moving elements associated with the track.

The previously mentioned individual buckets 12 are equally spaced along the length of the chain 22 and to this end each such bucket unit 12 includes a hanger dolly 24 consisting of an L bracket 25 having a roller or wheel 26 journaled to its upright leg so as to ride upon a horizontal ledge of the track structure 16. The horizontal leg of the L bracket 25 has a swivel pin 27 extending downwardly therefrom and through a link of the chain 22 so that the chain hangs from the track 16 by means of the dolly 24 when the latter is between the corner sprockets 21. The lower end of the swivel pin 27 terminates in a hook 28 below the chain 22 for receiving a looped hanger strand 29 in the form of a simple chain.

The individual bucket units 12 may be a conventional silo type feeder 30 such as is now available on the market. The silo feeder 30 shown consists of a tapering silo body 31, of smaller diameter at its top and having its larger diametered open bottom secured by welded clips 32 in spaced relation to a pan 33 which is of larger diameter than the open bottom of the silo body so that granular feed in the silo body will gravitate into the pan as the birds remove grain or feed from the same. The foregoing arrangement may include a cone deflector just above the pan and coaxially of the silo body so as to deflect the grain or feed to the extended perimeter of the pan 33.

As illustrated in Figs. 2, 3 and 4, the open upper end of the silo body 31 is provided with a heavy wire bale handle 34. This wire bale 34 has the ends of its legs hooked into aligned bores in the silo body and its mid portion bent at an angle to receive a hook or one loop of the strand 29 so that the feed silo 30 is suspended from the hanger dolly 24. In this connection it will be noted that the looped hanger strand 29 can be lengthened or shortened by engaging one or another of the individual links of the strand 29 with the hook 28 on the dolly. In this manner the pan 33 at the lower end of the silo feeder can be disposed at any desired or predetermined position relative to the floor F of the enclosure. It will thus be apparent that when the chicks are small the pan can be placed close to the floor F and as the birds grow the pan can be raised accordingly.

From the foregoing it will be seen that the arrangement is such that the plurality of feed buckets are adapted for movement in suspended relation along the overhead track 16 when the motor M is energized. While the track 16 is shown to provide a rectangular path it will be apparent that it may be in the form of a large circle, a square or with offsets, whichever is necessitated by the shape and arrangement of the building or enclosure within which the birds are to be raised. Suffice it to say that the track 16 provide a predetermined path of movement for the several feeder buckets suspended therefrom.

At one place along this predetermined path there is provided a filling station, generally designated 35. This filling station includes a predetermined portion 36 of the track 16, a guide rail 37 congruent thereto, and means 38 for holding a feed silo 30 in a fixed position relative to the discharge end of the supply hopper 13 which is a part of the filling station.

The supply hopper 13 may be any suitable tapering hopper or receptacle either suspended from the overhead structure of the enclosure or on suitable legs 40 as shown in Fig. 2. This hopper 13 is disposed to receive grain or feed by gravity from a supply bin, shown fragmentarily at 40' in Fig. 2, the filling end of which may be outside the enclosure or from an access opening in the roof thereof in any conventional manner. In this way there is always a supply of grain to the hopper 13.

The base 13' of the hopper 13 communicates with a discharge spout 41, the discharge end of which is disposed to pour the grain into a feed silo 30 when the latter is in a fixed position to receive the grain. In this connection it will be noted that although the grain is gravity fed into the hopper 13 and may well be discharged from the same in a like manner, some valve or gate means is required to stop the flow of grain from the spout 41 during intermittent movement of the feed buckets relative to the filling station 35. In accordance with the present invention, this valve or gate means is accomplished by the provision of a screw feed 42 comprising a helical worm shaft 43 suitably journaled for turning in the base of the hopper 13 and relative to the discharge spout 41. The opposite end of the worm shaft 43 is drivingly connected to a feed motor 44 so that only during energization of this feed motor will the grain flow from the hopper and on out of the discharge spout 41.

The feed motor 44 is arranged in the electrical circuit 15 as a part of the control means 14 now to be explained. Referring to Fig. 5, the control means 14 further includes two sets of two way switches 45 and 45'. One set 45 of these switches is disposed adjacent the guide rail 37 and operatively associated with a turnstile 47 for shutting off the circuit 15 to the motor M while a silo feeder 30 is at the feed station. The other set 45' of the two way switches is connected to a depressible button 48 beneath the silo feeder which is at the filling station and is normally effective to complete the circuit 15 to the feed motor 44. In this manner, grain is poured from the discharge end of the spout 41 into the open upper end of the silo feeder 30 at the filling station until the filled feeder weighs down upon the depressible button 48 to change the condition of the two way switch 45'. Thus the switch 45' cuts off the flow of electrical energy to the feed motor 44 and directs it through the conveyor motor M. In this manner the conveyor 11 is operated to move the filled silo feeder away from the filling station 35 and to move the next successive silo feeder into the filling station.

Having thus generally described the operation of control means 14, each phase thereof will now be defined in specific detail. Both sets of two-way switches 45 and 45' are similar in construction and therefore prime numerals will be used on the switch 45' to distinguish it from the switch 45. These switches may be of any well known form of two-way switch available. Suffice it to say that such two-way switches each include companion switch arms 49—50 (49'—50') each of which move concurrently to opposite poles or contact points 51—52 (51'—52') or 53—54 (53'—54') upon operation of its mechanical adjunct, the turnstile 47 in the case of switch 45 and the depressible button 48 in the case of switch 45'.

As illustrated in the schematic diagram of Fig. 5, the circuit 15 to the conveyor motor M is established as follows: from the source of power P via conductor 55 to the pintle of arm 49' of two-way switch 45'. Contact point 51' being in contact with its switch arm 49' current flows via conductor 56 to contact point 51 of switch 45 thence through switch arm 49 thereof via conductor 57 to one side of motor M. From the other terminal of motor M current flows via conductor 58 back to the source of power P. Note, however, that conductor 58 is capable of being interrupted by opening of a switch 59 adjacent the source of power P and that this switch 59 is associated with a clock 60 affording a chronometric control phase for the circuit 15 so as to operate the same at a desired time of the day or night. Note also that all other phases of the circuit 15 are de-energized at this stage so that during operation of the motor M all other units of the control 14 are inoperative. In this manner the conveyor 11 moves the several feed buckets 12 along the predetermined path provided by the track 16.

As a silo feeder 30 approaches the feed station 35, as illustrated in dot-dash lines Fig. 4, one leg of the bale handle 34 strikes the outwardly flared receiving end 61 of the guide rail 37 to thereby turn the bale handle 34 into a position in which both its legs engage the rail 37, i. e., become aligned with the rail and the path of movement of the silo feeder 30. Thus the particular silo feeder 30 approaches the stop position of feeding station 35 at which position the turnstile 47 is located.

The turnstile 47 includes quadrant spokes 62—62' and 63—63' diametrically opposite each other and radially disposed relative to a shaft 64 extending upwardly from the main body of the switch 45. The shaft 64 is connected to the companion switch arms 49—50 of the switch 45 for moving the arms relative to their respective contact points 51—52 and 53—54. The turnstile 47 has only two positions in which change of position of the contact arms 49—50 is effected. While the conveyor 11 is in motion, the turnstile 47 is in a neutral position as, for instance, is shown in Fig. 5. However, when the turnstile is moved from neutral one quarter step as shown in Fig. 4, the contact arms 49—50 are moved relative to their contact points. The next quarter step of the turnstile does not change the position of arms 49—50 but merely resets the quadrantal spokes into neutral position preparatory to operation by the next incoming feeder bucket.

Assuming now that switch 45 is conditioned as illustrated in Fig. 5 when the leading leg of the handle 34 on the incoming bucket 12 strikes the spoke 62 of the turnstile 47, the shaft 64 is turned and with it the companion arms 49 and 50 to move the same away from contact points 51—52 and into circuit making position between contact points 53—54. This moves the turnstile 47 out of neutral position and breaks the aforementioned completed circuit to the motor M by reason of the transposition of the switch arm 49 away from contact point 51 and into contact with point 53.

It should here be noted that the turnstile 47 is provided with self-operated means such as a spring-urged pawl and star wheel (not shown) of any well known design. In this manner the quadrantal spokes are positively urged into polar positions after partial movement thereof beyond halfway between quadrantal position as by action of the leading leg of the handle 34 on the incoming bucket (see Fig. 4).

From the foregoing it will be seen that the conveyor 11 ceases to operate upon opening of the circuit between contact point 51 and switch arm 49. While the conveyor 11 may tend to override by momentum the holding means 38 is promptly energized simultaneously with the opening of the circuit to the motor M. This is accomplished through the positioning of the switch arm 50 into engagement with contact point 54 when the turnstile 47 is moved from neutral to the next quadrantal position.

Upon contact of switch arm 50 with contact point 54 the following circuit is established: Current flows from the source of power P via conductor 55 into conductor 65 to the pintle of arm 50' in switch 45'. Thence to contact point 52' and conductor 66 connecting the latter to contact point 54 of switch 45. Current therefore flows across switch arm 50 to its pintle which is connected to two separate lines, one 67 connected to one side of feed motor 44 and the other 68 connected to one side of a coil 69 wound around a core 70 for magnetizing the latter. The opposite side of both the feed motor 44 and the coil 69 connect to conductor 71 in turn connected to the conductor 58 just inside the previously mentioned switch 59 for flow therethrough back to the source of power.

The coil 69 and core 70 thereof constitute the holding means 38, the end of core 70 being disposed to face the incoming silo feeder 30 for magnetically attracting the same during flow of current through the coil 69. In this manner the silo feeder 30 is held in a fixed position while at the filling station 35 so as to register the open upper end of the silo body with the discharge end of the spout 41.

Simultaneous with the energization of the holding means 38 the feed motor 44 is energized to turn the screw or worm shaft 43 to positively convey grain along the base of the hopper for uniform flow into the particular silo feeder 30 in register with the discharge end of spout 41.

As previously mentioned, the present invention contemplates that the silo feeder being filled weigh down upon the depressible button 48 to effect operation of the lower two-way switch 45'. This entails a weighing means which is formed as a part of the conveyor track 16 in that portion 36 thereof which is in the zone of the filling station 35. In this connection the portion 36 of the track 16 is severed from the same but has one end hingedly connected thereto as at 72. This hinge connection 72 is at the discharge end of the track portion 36 in relation to the direction of movement of the bucket units 12 by the conveyor 11. The opposite free end or receiving end of the track portion 36 is completely free from the adjacent section of the track 16 but is normally supported in alignment therewith by a tension spring 73 calculated to support an empty or sparsely filled silo feeder and the free end of track portion 36 in horizontal alignment with the other silo feeders suspended from the track 16. This spring 73 has its upper end suitably anchored to a part of the overhead structure from which the track 16 is suspended and may be provided with conventional adjustment for setting the spring to yield at a predetermined weight. The arrangement is such that as the silo feeder at filling station 35 is just about filled the spring 73 will begin to yield under the load it carries. Thus the silo feeder 30 being filled weighs down upon the depressible button 48 to effect operation of the lower two-way switch 45' associated therewith.

Means for limiting the distance or drop of the free end of track section 36 consist of an angle clip 74 secured to the upper end of the free end of the track portion 36 so as to overlie the adjacent end of the main track 16. Thus when the silo feeder 30 under the spout 41 is filled with grain, the spring 73 is stretched by the weight of the same, for example from full to dot-dash lines Fig. 3. In this manner the lower face of the pan 33 bears down upon the depressible button 48.

The depressible button 48 is operatively connected to the switch arms 49'—50' in the lower two-way switch 45' in such a manner that each time the button 48 is pressed down these switch arms change their position. The button 48 is free to reset itself, i. e., to rise again by action of a spring 75 without affecting the position of the switch arms 49'—50'.

Referring now to Fig. 5, upon depression of the button 48 by the weight of the silo feeder 30 bearing down upon the same, the switch arms 49'—50' are caused to change their positions so that switch arm 49' moves from contact point 51' into engagement with contact point 53' while switch arm 50' moves from contact point 52' into engagement with contact point 54.' Thereupon the following occurs in the circuit 15: The flow of electrical current through the feeder motor 44 as well as the coil 69 of the holding means 38 is cut off. This is so because the foregoing circuit was established through contact point 54 of the upper two-way switch 45 by way of conductor 66 to contact point 52' of the lower two-way switch. This contact point 52' being now out of contact with its switch arm 50' breaks the circuit to feed motor 44 as well as the coil 69. This shuts off flow of grain from the hopper 13 into the silo feeder at the feed station and releases that feeder from the magnetic attraction of the holding means 38. Simultaneous with the foregoing, the circuit is again established to the main motor M for the conveyor 11. This occurs when switch arm 49' engages contact point 53' so that current now flows from the source of power P via conductor 55 to the pintle of switch arm 49', across the latter into contact point 53' thence via conductor 76 into contact point 51 of the upper two-way switch 45 which, as will be recalled, was reconditioned with its switch arm 49 in engagement with conatct point 51. Thus current again flows via conductor 57 through motor M and back to the source of power via conductor 58.

Accordingly the conveyor 11 is again set in motion to move the several feed buckets 12 along the predetermined path. Upon initial movement of a filled silo feeder 30 away from the filling station 35, the trailing leg of the handle 34 on the outgoing silo feeder strikes the quadrant spoke 63 on the turnstile 47 so as to turn the latter a quarter of a revolution. This sets the upper two-way switch in a neutral position so that quadrant spoke 62', as seen in Fig. 4, will now extend transverse of the guide rail 37 for engagement by the leading leg of the handle 34 on the next or incoming silo bucket 30.

Referring to Fig. 3 it will be remembered that the track section 36 has been weighed down to a position as depicted in dot-dash lines. The discharge end of the track section 36 being hingedly connected as at 72 to the main track 16, the track section 36 becomes a ramp upon which the dolly 24 can be drawn upwardly by the conveyor chain 22 until the wheel 26 of the dolly 24 again rides upon the main track 16. As soon as the loaded silo feeder 30 leaves the filling station 35 the spring 73 draws the free end of track section 36 back into register with the adjacent end of the main track 16. Note that a metal clip 77 secured to the under side of the track section 36 at the free end thereof extends under the main track 16 to limit upward movement of track section 36 by the spring 73. Thus the track section 36 is again aligned with the main track to receive the dolly of the next or incoming silo feeder 30.

The foregoing procedure repeats as hereinbefore explained, each silo feeder 30 entering the filling station 35 shutting off the motor M upon a quarter turn of the turnstile 47 and establishing circuit to the feed motor 44 and holding means 38. As soon as the silo feeder is filled sufficiently to weight down upon the depressible button 48 the lower two-way switch is operated to shut off the feed motor 44 and holding means 38 and at the same time the conveyor motor M is again energized to drive the conveyor chain 22.

It will be appreciated that the foregoing operation of the feeding device 10 should occur preferably during the night time while the birds are at rest. Thus it will be seen that the switch 59 is set to be operated by the clock 60 so that all of the feed buckets 12 are filled automatically through a predetermined period of the night. This period can be calculated on the basis of the number of feed buckets employed and the clock 60 set to operate the switch 59 only during such predetermined period of time.

With this feeding device 10 the working parts are sufficiently high up off the floor F to minimize any clogging of the device by droppings or scratchings. The depressible button 48 on the floor F of the enclosure is guarded by a suitable corrugated rubber hood of conventional design and can be adjusted vertically to compensate for any shortening of the looped strand 29 by which the silo feeders are suspended from their respective dollies. In this manner the pans 33 can be set at various heights from the floor F in accordance with the growth of the birds.

Having thus described my poultry feeding device in specific detail it will be appreciated that it is susceptible to variations, modifications and alterations without departing from the spirit of my invention. I therefore desire to avail myself of all variations, modifications and alterations as fairly come within the purview of the appended claims.

What I claim as new and desire to protect by Letters Patent is:

1. A poultry feeding device comprising an overhead conveyor including a track arranged to provide a predetermined path, an endless chain trained around said track, a motor means for driving said chain, a plurality of dollies riding on said track and each connected to said chain at spaced positions along the same for movement therewith, a silo feeder suspended from each said dolly, said conveyor having a feed station, a feed hopper at said feed station, a feed spout communicating with said hopper having its discharge end disposed to pour feed from said hopper into the open upper end of a silo feeder stopped at said feed station, an electrically operated valve means in said feed spout for normally stopping the flow of feed therethrough, a control means comprising an electrical circuit and upper and lower switch means crosswired to alternately operate said motor means and said valve means, said control means including a turnstile operatively associated with said upper switch means and engageable by a silo feeder approaching said feed station for changing the condition of said upper switch to shut off flow of current to said motor means and to complete the circuit to said valve means for discharging feed into the open upper end of the silo feeder in register therewith, and a depressible button connected to said lower switch at said feed station beneath the silo feeder receiving feed adapted to be depressed by the latter for changing the condition of said lower switch to shut off flow of current to said valve means and to complete circuit to said motor means.

2. A poultry feeding device comprising an overhead conveyor including a track arranged to provide a predetermined path, an endless chain trained around said track, a motor means for driving said chain, a plurality of dollies riding on said track and each connected to said chain at spaced positions along the same for movement therewith, a silo feeder suspended from each said dolly, said conveyor having a feed station, a feed hopper at said feed station, a feed spout on said hopper having its discharge end disposed to pour feed from said hopper into the open upper end of a silo feeder, an electrically operated valve means in said feed spout for normally stopping the flow of feed therethrough, electromagnetic holding means at said feed station, a control means comprising an electrical circuit including upper and lower switch means for facilitating alternate operation of said motor means and said valve and holding means, said control means including a turnstile at said feed station operatively associated with said upper switch means and engageable by a silo feeder as it approaches said feed station for changing the condition of said upper switch to shut off flow of current to said motor means and to complete the circuit to said valve means and said holding means for magnetically holding said silo feeder in register with said spout and for discharging feed into the open upper end of said silo feeder, a depressible button beneath the silo feeder receiving feed from said spout and operatively associated with said lower switch means for changing condition of the latter to shut off flow of current to said valve, and holding means and to complete circuit to said motor means, and yieldable means supporting that section of said track at said feed station adapted to yield under the load of a silo feeder filled with feed for pressing down upon said depressible button.

3. A poultry feeding device comprising an overhead track arranged to provide a predetermined circuitous path, a plurality of feed buckets each including a dolly ridable on said track and a silo feeder suspended from said dolly, an endless linkage trained around said track and secured at spaced intervals to each of said dollies, a motor means drivingly connected to said linkage for moving the same around said track, a feed hopper arranged adjacent said track including a spout having its discharge end disposed to pour feed from said hopper into the open upper end of a silo feeder in register therewith, valve means in said spout for closing the same, and a control means comprising an electrical circuit including upper and lower two-way switches cross wired to complete circuit to either said motor means or said valve means, a turnstile operatively connected to said upper two-way switch engageable by a silo feeder about to register with said spout for reconditioning said upper switch to de-energize said motor means and energize said valve means, a depressible button operatively connected to said lower two-way switch disposed beneath a silo feeder in register with said spout for engagement by the latter upon filling of the same for changing the position of said lower two-way switch to re-energize said motor means and de-energize said valve means.

4. A poultry feeding device comprising an overhead track arranged to provide a predetermined circuitous path, a plurality of feed buckets each including a dolly ridable on said track and a silo feeder suspended from said dolly, an endless linkage trained around said track and secured at spaced intervals to each of said dollies, a motor means drivingly connected to said linkage for moving the same around said track, a feed hopper arranged adjacent said track including a spout having its discharge end disposed to pour feed from said hopper into the open upper end of a silo feeder in register therewith, weighing means on that portion of said track supporting a silo feeder in register with said spout adapted to be weighed down when said silo feeder is filled, valve means in said spout for closing the same, and a control means comprising an electrical circuit including upper and lower two-way switches cross wired to complete circuit to either said motor means or said valve means, a turnstile operatively connected to said upper two-way switch engageable by a silo feeder about to register with said spout for reconditioning said upper switch to de-energize said motor means and energize said valve means, a depressible button operatively connected to said lower two-way switch disposed beneath a silo feeder in register with said spout for engagement by the latter upon filling of the same for depressing said button for changing the position of said lower two-way switch to re-energize said motor means and de-energize said valve means.

5. A poultry feeding device comprising an overhead track arranged to provide a predetermined circuitous path, a plurality of feed buckets each including a dolly ridable on said track and a silo feeder suspended from said dolly, an endless linkage trained around said track and secured at spaced intervals to each of said dollies, a motor means drivingly connected to said linkage for moving the same around said track, a feed hopper arranged adjacent said track, including a spout having its discharge end disposed to pour feed from said hopper into the open upper end of a silo feeder in register therewith, an electromagnetic holding means disposed to engage a silo feeder in register with said spout, weighing means in that section of said track supporting a silo feeder in register with said spout adapted to be weighed down by said silo feeder when the latter is filled with feed, valve means in said spout for closing the same, and a control means comprising an electrical circuit including upper and lower two-way switches cross wired to complete circuit to either said motor means or said holding means and said valve means, a turnstile operatively connected to said upper two-way switch engageable by a silo feeder about to register with said spout for reconditioning said upper switch to de-energize said motor means and to energize said holding means and valve means, a depressible button operatively connected to said lower two-way switch disposed beneath a silo feeder in register with said spout for engagement by the latter upon weighing down of the same for changing the position of said lower two-way switch to re-energize said motor means and de-energize said holding means and valve means.

6. A poultry feeding device comprising an overhead conveyor providing a predetermined circuitous path, a plurality of dollies ridable on said conveyor, a silo feeder suspended from each of said dollies, an endless linkage trained around said conveyor and secured at spaced intervals to each of said dollies for moving the same therewith in spaced relation, a motor means drivingly connected to said linkage for moving the same around said conveyor, a feed hopper arranged adjacent said conveyor including a spout having its discharge end disposed to pour feed from said hopper into the open upper end of a silo feeder in register therewith, valve means in said spout for closing the same, and a control means comprising an electrical circuit including upper and lower two-way switches cross wired to complete circuit to either said motor means or said valve means, a turnstile operatively connected to said upper two-way switch engageable by a silo feeder about to register with said spout for reconditioning said upper switch to de-energize said motor means and to energize said valve means, weighing means on said conveyor yieldable upon loading of a silo feeder to its capacity, a depressible button operatively connected to said lower two-way switch disposed beneath a silo feeder in register with said spout for engagement by the latter upon filling of the same for changing the position of said lower two-way switch to re-energize said motor means and de-energize said valve means.

7. A poultry feeding device comprising an overhead conveyor including a track, an endless chain adjacent said track and motor means for moving said chain, a plurality of individual silo feeders suspended from said track and each connected to said chain in spaced relation for movement thereby, said conveyor having a section thereof at a feed station, electrical holding means at said feed station engageable by a silo feeder there disposed, a feed hopper adjacent said feed station having a spout discharging feed into the open upper end of a silo feeder therebeneath, an electrically operated valve means associated with said hopper, a control means comprising an electrical circuit including a pair of cross wired two-way switches alternately conditionable to energize either said motor means or said holding means and said electrically operated valve means, detector means at said feed station operable by a silo feeder approaching the same and operatively connected to one of said two-way switches for reconditioning the same for de-energizing said motor means and for energizing said holding means and said electrically operated valve means when said detector means is operated by a silo feeder entering said feed station, weighing means for a silo feeder being filled at said feed station and operatively connected to the other one of said two way switches for reconditioning the same for de-energizing said holding means and said electrically operated valve means and for energizing said motor means.

8. A poultry feeding device comprising an overhead conveyor including an endless linkage and motor means for driving the same, a plurality of individual feed buckets suspended from said linkage in spaced relation for movement therewith, said conveyor having a feed station at a desired position along its length, a feed hopper at said feed station, an electrically operated valve means associated with said hopper for normally shutting off the flow of grain therefrom, and a control means comprising an electrical circuit embodying upper and lower two-way switches normally conditioned to supply electrical current to said motor means, and detector means operable by a feed bucket at said feed station for de-energizing said motor means and energizing said holding means and said electrically operated valve means upon arrival of a feed bucket at said feed station and operable by said feed bucket when filled with feed to de-energize said holding means and said electrically operated valve means and to re-energize said motor means.

References Cited in the file of this patent

UNITED STATES PATENTS

| | | |
|---|---|---|
| 1,518,664 | Maryott | Dec. 9, 1924 |
| 1,815,679 | Ruth | July 21, 1931 |
| 2,311,747 | Gooch | Feb. 23, 1943 |
| 2,314,344 | Cornell | Mar. 23, 1943 |
| 2,538,413 | Chard | Jan. 16, 1951 |
| 2,601,057 | Roberts et al. | June 17, 1952 |
| 2,681,639 | Littlefield | June 22, 1954 |
| 2,685,863 | Martin | Aug. 10, 1954 |